(12) United States Patent
Yamazaki et al.

(10) Patent No.: US 10,363,625 B2
(45) Date of Patent: Jul. 30, 2019

(54) HIGH-CURRENT-DENSITY GAS-SHIELDED ARC WELDING

(75) Inventors: Kei Yamazaki, Fujisawa (JP); Reiichi Suzuki, Fujisawa (JP); Yimin Yuan, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 1524 days.

(21) Appl. No.: 13/085,966

(22) Filed: Apr. 13, 2011

(65) Prior Publication Data

US 2011/0253679 A1  Oct. 20, 2011

(30) Foreign Application Priority Data

Apr. 14, 2010  (JP) .................. 2010-092998

(51) Int. Cl.
*B23K 9/00* (2006.01)
*B23K 35/38* (2006.01)
*B23K 9/09* (2006.01)
*B23K 9/173* (2006.01)
*B23K 35/02* (2006.01)
*B23K 35/30* (2006.01)

(52) U.S. Cl.
CPC .............. *B23K 9/09* (2013.01); *B23K 9/173* (2013.01); *B23K 35/0266* (2013.01); *B23K 35/3053* (2013.01); *B23K 35/383* (2013.01)

(58) Field of Classification Search
CPC ........ B43K 19/16; C21D 1/42; B05D 3/0272; B23P 25/003; B27M 1/06
USPC ............... 219/74, 56, 73.2–76.1, 85.2, 219/145.1–146.52; 148/23–30
See application file for complete search history.

(56) References Cited

U.S. PATENT DOCUMENTS

| 3,361,892 | A | | 1/1968 | Spencer | |
|---|---|---|---|---|---|
| 3,475,586 | A | | 10/1969 | Normando et al. | |
| 3,995,138 | A | | 11/1976 | Kalev et al. | |
| 4,463,243 | A | * | 7/1984 | Church | B23K 35/383 219/130.51 |
| 5,233,160 | A | * | 8/1993 | Gordish et al. | 219/137 WM |
| 6,303,891 | B1 | * | 10/2001 | Gault | B23K 35/383 219/137 R |
| 6,512,201 | B2 | * | 1/2003 | Blankenship | B23K 9/091 219/130.1 |

(Continued)

FOREIGN PATENT DOCUMENTS

| CN | 101032778 A | 9/2007 |
|---|---|---|
| JP | 58-138569 | 8/1983 |

(Continued)

OTHER PUBLICATIONS

U.S. Appl. No. 13/085,966, filed Apr. 13, 2011, Yamazaki, et al.

(Continued)

*Primary Examiner* — Tu B Hoang
*Assistant Examiner* — Thomas J Ward
(74) *Attorney, Agent, or Firm* — Oblon, McClelland, Maier & Neustadt, L.L.P.

(57) ABSTRACT

Disclosed is a method for performing gas-shielded pulsed arc welding at high current densities with a flux-cored wire as an electrode wire. The pulsed arc welding is carried out by passing a pulsed current so that a pulse peak current density during a pulse peak time Tp is 400 to 950 A/mm$^2$, a pulse base current density during a pulse base time Tb is 200 A/mm$^2$ or more and differs from the pulse peak current density by 200 to 400 A/mm$^2$, and an average current density is 350 to 750 A/mm$^2$. The method allows significant spatter reduction while attaining a high deposition rate.

8 Claims, 2 Drawing Sheets

(56) References Cited

U.S. PATENT DOCUMENTS

| | | | |
|---|---|---|---|
| 2002/0130117 A1 | 9/2002 | Briand et al. | |
| 2005/0269296 A1* | 12/2005 | Arakawa | B23H 7/04 219/69.12 |
| 2007/0102409 A1 | 5/2007 | Koshiishi et al. | |
| 2007/0181549 A1* | 8/2007 | Hartman | B23K 35/3053 219/137 WM |
| 2007/0210048 A1* | 9/2007 | Koshiishi | B23K 9/092 219/130.51 |
| 2008/0142490 A1 | 6/2008 | Suzuki et al. | |
| 2009/0261085 A1 | 10/2009 | Suzuki et al. | |

FOREIGN PATENT DOCUMENTS

| | | |
|---|---|---|
| JP | 59-45084 | 3/1984 |
| JP | 3-35881 | 2/1991 |
| JP | 3-169485 | 7/1991 |
| JP | 6-210451 | 8/1994 |
| JP | 7-290241 | 11/1995 |
| JP | 2000-225465 | 8/2000 |
| JP | 2007-237270 | 9/2007 |
| JP | 2007-296535 | 11/2007 |

OTHER PUBLICATIONS

U.S. Appl. No. 13/076,915, filed Mar. 31, 2011, Yamazaki, et al.

Extended Search Report dated Aug. 5, 2011 in European Patent Application No. 11002940.2-2302.

Combined Office Action and Search Report dated Jun. 5, 2013 in Chinese Patent Application No. 201110091034.2 with English language transaltion and English translation of categories of cited documents.

* cited by examiner

FIG.1
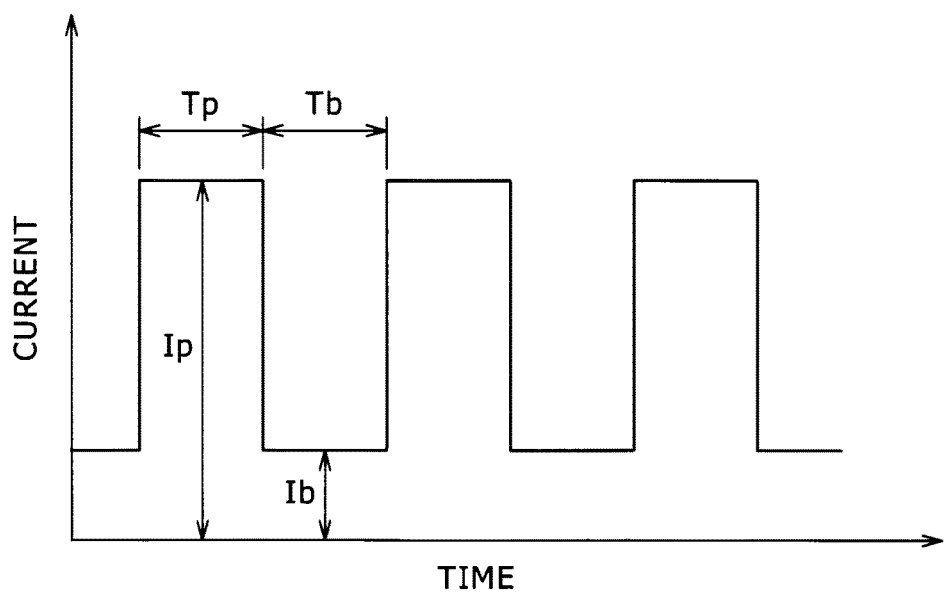
FIG.2A    FIG.2B    FIG.2C
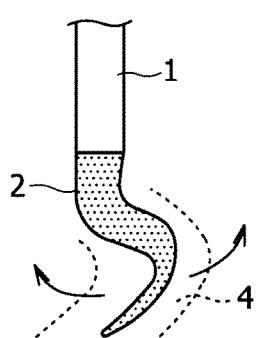 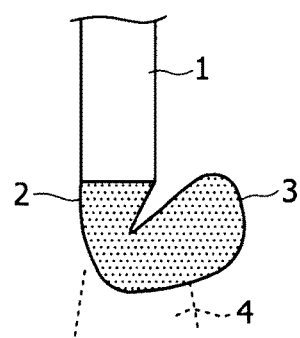 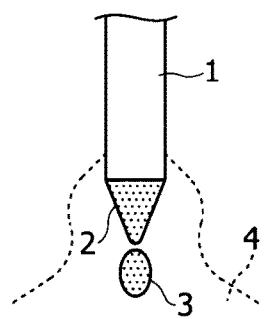

HIGH-CURRENT-DENSITY GAS-SHIELDED ARC WELDING

TECHNICAL FIELD

The present invention relates to a method for high-current-density gas-shielded arc welding, which is used typically in single-layer or multilayer welding within a fillet or groove typically in the field of transportation equipment and construction equipment.

BACKGROUND ART

In the field typically of transportation equipment and construction equipment, single-layer or multilayer welding in a fillet or groove is often performed through gas metal arc welding. This technique employs a high welding current to perform welding at a higher wire melting speed so as to achieve a higher efficiency. However, such an increased current density causes generation of spatters in large amounts, and this causes inferior appearance of the weld beads and requires an extra step for removing the spatters, resulting in an insufficient production efficiency.

Solid wires are generally used in the field. However, when used in welding at a high current density of 300 A/mm² or more, the solid wires present a droplet transfer mode called rotating transfer. Specifically with reference to FIG. 2A, excessive Joule heating in a wire extending portion 1 ranging from a contact tip to an arc generation spot causes the wire to be softened and melted to thereby elongate from its tip, and the resulting tip molten metal 2 transfers while rotating with an arc 4.

In addition to the rotating transfer, exemplary droplet transfer modes further include globular transfer as illustrated in FIG. 2B in which a molten droplet 3 having a size larger than the outer diameter of the wire extending portion 1 transfers while being repelled; and spray transfer as illustrated in FIG. 2C in which a molten droplet 3 having a size smaller than the outer diameter of the wire extending portion 1 transfers. In the rotating transfer, most of the pinched-off molten droplet spatters to surroundings, thus causing a remarkable spatter generation rate. In the globular transfer, a large amount of large-sized spatters is generated. In the spray transfer, a small amount of spatters is generated. Accordingly stabilization of spray transfer is a key to reduce spatter generation rate.

Independently, the following welding methods have been proposed in known techniques as methods for performing gas-shielded arc welding at high current densities typically in fillet welding and multilayer welding.

JP-A No. S59 (1984)-45084 proposes a welding method to attain a high deposition rate (amount of deposited metal) by using a solid wire as an electrode wire and using a four-component gaseous mixture containing 40 to 70 percent by volume of argon, 25 to 60 percent by volume of helium, 3 to 10 percent by volume of carbon dioxide, and 0.1 to 1 percent by volume of oxygen as a shielding gas.

JP-A No. H03 (1991)-169485 proposes a welding method to attain a high deposition rate and to attain a bead smoothing effect by the action of slag, in which welding is performed with a slag-based flux-cored wire as an electrode wire and carbon dioxide gas as a shielding gas at a current density of 300 A/mm² or more.

JP-A No. H03 (1991)-35881 proposes a welding method to attain a good penetration shape, in which welding is performed using a solid wire and a shielding gas at a current density of 300 A/mm² or more, where the solid wire has a resistivity $\rho$ of 25 to 65 $\mu\Omega \cdot cm$ and contains sulfur (S) in a content of 0.010 to 0.040 percent by mass, and the sulfur content and the resistivity $\rho$ satisfy the condition: K=20 to 40 wherein K=505·S+0.41·$\rho$; and the shielding gas is a gaseous mixture containing $CO_2$ in a content of 2 to 20 percent by volume and $O_2$ in a content of 1 to 10 percent by volume with the remainder being argon (Ar), in which the $CO_2$ content and the $O_2$ content satisfy the condition: [$CO_2$+ 2×$O_2$]≥20 percent by volume.

SUMMARY OF INVENTION

Technical Problem

The welding method disclosed in JP-A No. S59 (1984)-45084 is intended to stabilize spray transfer (see FIG. 2C) but fails to improve or suppress rotating transfer when welding is performed at further higher current densities, thus causing large amounts of spatters.

The welding method disclosed in JP-A No. H03 (1991)-169485 uses a carbon dioxide gas as the shielding gas and thus causes globular transfer (see FIG. 2B), resulting in large amounts of large-sized spatters.

The welding method disclosed in JP-A No. H03 (1991)-169485 is intended to stabilize the penetration shape through stabilization of rotating transfer (see FIG. 2A) but fails to suppress generation of small spatters with rotating transfer, resulting in deposition of large amounts of spatters in the vicinity of weld beads. Such small spatters, if deposited, are difficult to remove, leading to poor production efficiency.

Accordingly, the present invention has been made to solve these problems, and an object of the present invention is to provide a method for high-current-density gas-shielded arc welding, which attains significant reduction in spatter while providing a high deposition rate.

Solution to Problem

To achieve the object, the present invention provides, in an aspect, a high-current-density gas-shielded arc welding method, the method including the step of performing pulsed arc welding with a flux-cored wire as an electrode wire, in which the pulsed arc welding is carried out by passing a pulsed current so that a pulse peak current density during a pulse peak time Tp is 400 to 950 A/mm², a pulse base current density during a pulse base time Tb is 200 A/mm² or more and differs from the pulse peak current density by 200 to 400 A/mm², and an average current density is 350 to 750 A/mm².

According to this configuration, the pulse peak current density, pulse base current density, and average current density in the pulsed arc welding with the flux-cored wire are set within specific ranges. The configuration therefore stabilizes the spray transfer to reduce the spatter generation rate even during welding at high current densities, and significantly increases the deposition rate as compared to customary welding methods performed at the same welding current.

In a preferred embodiment of the high-current-density gas-shielded arc welding method according to the present invention, the shielding gas is preferably a gaseous mixture containing $CO_2$ in a content of 5 to 35 percent by volume with the remainder being argon (Ar).

The configuration employs the specific shielding gas, thereby reduces the spatter generation rate during pulsed arc welding at high current densities, and simultaneously suppresses the formation of oxide and thereby reduces the slag generation rate. In addition, the configuration improves flexibility and economical efficiency of the method, since the two-component gaseous mixture of Ar and $CO_2$ is not a special gas but a widely used gas as the shielding gas.

In another preferred embodiment of the high-current-density gas-shielded arc welding method according to the present invention, the flux-cored wire includes a steel sheath; and a flux filled in the sheath, and the flux-cored wire has a flux filling rate of 10 to 25 percent by mass based on the total mass of the wire and contains carbon (C) in a content of 0.08 percent by mass or less, silicon (Si) in a content of 0.5 to 1.5 percent by mass, manganese (Mn) in a content of 1.5 to 2.5 percent by mass, and titanium (Ti) in a content of 0.1 to 0.3 percent by mass.

The flux-cored wire used in this embodiment has the predetermined chemical composition, thereby helps to reduce turbulence in droplet transfer during the pulsed arc welding and to reduce the spatter generation rate, and simultaneously reduces the slag generation rate. In addition, this configuration gives weld beads having good shapes.

The high-current-density gas-shielded arc welding method according to the present invention performs pulsed arc welding at current densities within the predetermined range, thereby achieves significant reduction in spatter while providing a high deposition rate. As a result, the method attains welding with efficiency equal to or higher than that in customary methods and eliminates the need of extra time and effort to perform a process of removing spatter, resulting in further improved efficiency in the welding process. In addition, the method eliminates the need of extra time and effort to perform a process of removing slag in multilayer welding and gives weld beads with beautiful appearance.

BRIEF DESCRIPTION OF DRAWINGS

FIG. 1 is a schematic view showing the designations of a pulse waveform in the high-current-density gas-shielded arc welding method according to the present invention;

FIGS. 2A, 2B, and 2C are schematic diagrams of rotating transfer, globular transfer, and spray transfer, respectively, as droplet transfer modes in welding.

DESCRIPTION OF EMBODIMENTS

Figure 3:
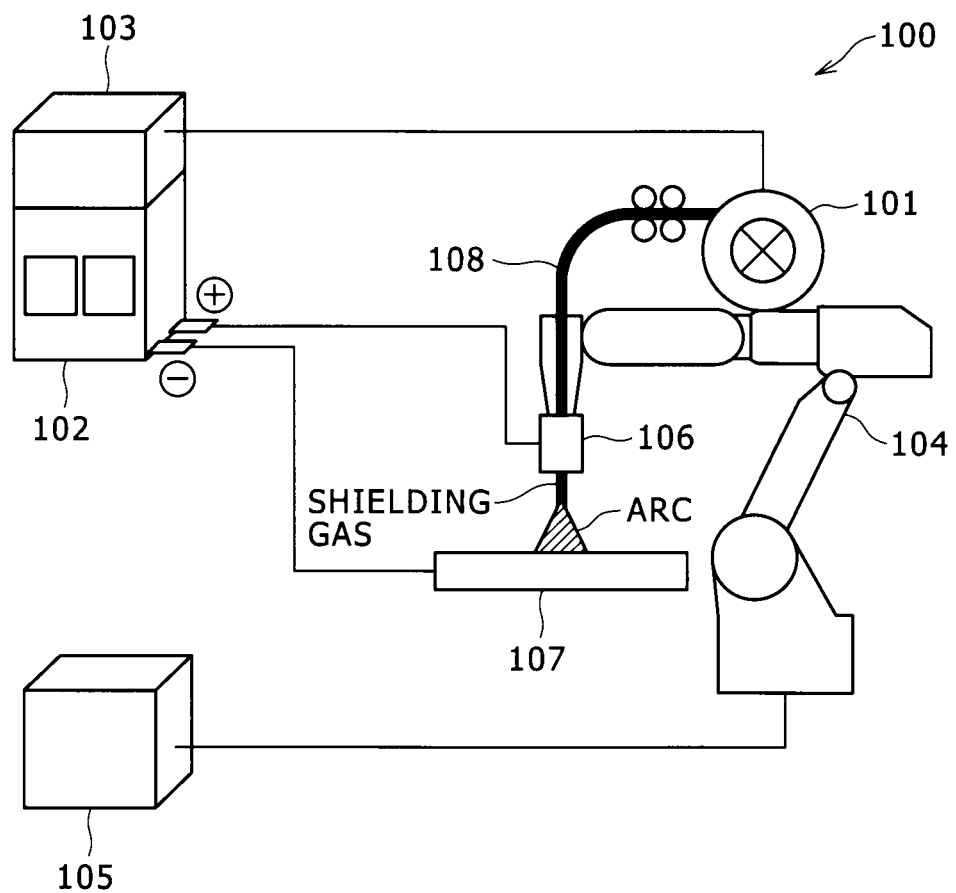
FIG. 3 is a schematic diagram schematically illustrating exemplary welding equipment for use in the high-current-density gas-shielded arc welding method.

Initially, welding equipment for use in the high-current-density gas-shielded arc welding method according to the present invention will be described. The welding equipment is not limited, as long as being welding equipment for performing gas-shielded pulsed arc welding, and may be known or customary welding equipment.

As illustrated in FIG. 3, the welding equipment 100 includes, for example, a welding torch 106, a robot 104, a wire feed unit 101, a welding power source 102, and a power-source control unit 103. The welding torch 106 has, both at the tip thereof, a flux-cored wire 108 working as a consumable electrode; and a shielding gas nozzle (not shown) for feeding a shielding gas, arranged around the outer periphery of the flux-cored wire 108. The welding torch 106 is attached at the tip of the robot 104, and the robot 104 moves the welding torch 106 along the weld line on a workpiece 107. The wire feed unit 101 feeds the flux-cored wire 108 to the welding torch 106. The welding power source 102 feeds a pulsed current via the wire feed unit 101 to the flux-cored wire 108 to generate pulsed arc between the flux-cored wire 108 and the workpiece 107. The power-source control unit 103 controls the pulsed current of the welding power source 102. The welding equipment 100 may further include a robot control unit 105 to control the operation of the robot for moving the welding torch 106. The power-source control unit 103 and the robot control unit 105 include, for example, a central processing unit (CPU), read-only memory (ROM), random-access memory (RAM), hard disk drive (HDD), and input-output interface.

The high-current-density gas-shielded arc welding method is featured by controlling the pulsed current in the power source control unit under predetermined conditions when pulsed arc welding is performed using the welding equipment. More specifically, the method is featured by specifying the pulsed current densities within the specific ranges. The high-current-density gas-shielded arc welding method according to the present invention will be illustrated below.

The high-current-density gas-shielded arc welding method performs pulsed arc welding with a flux-cored wire as an electrode wire, in which the pulse peak current density during a pulse peak time, the pulse base current density during a pulse base time, and the average current density in the pulsed current in the pulsed arc welding are specified or controlled within the specific ranges.

As used herein the term "pulse" refers to a current waveform as illustrated in FIG. 1, which is formed from a pulse power source and which includes repeating rectangular or trapezoidal forms (rectangular forms in the example of FIG. 1). Herein, a pulse peak time Tp and a pulse peak current Ip are defined as the time (duration) and the current during the top of the rectangular or trapezoidal wave; a pulse base time Tb and a pulse base current Ib are defined as the time and the current during the bottom of the wave; and an average current Ia is defined as an average with time of the time integration of the welding current. The following equation holds for the rectangular wave in FIG. 1: $Ia=(Ip \cdot Tp + Ib \cdot Tb)/(Tp+Tb)$. A current density is obtained by dividing each current value by the sectional area of the current path in the wire.

Reasons why such a flux-cored wire is used in the present invention will be described below.

High-current-density gas-shielded arc welding, if using a solid wire, presents rotating transfer and thereby causes large amounts of spatters. The rotating transfer (phenomenon) is caused by the uniform cross section of the solid wire and by the action of electromagnetic force of unstable arc. Specifically, the tip of the solid wire having a uniform cross section is prone to be softened and to elongate at high current densities, and if arc, which becomes unstable by the action of the high current, deflects even slightly, the elongated tip molten metal 2 receives centripetal force through an interaction between the formed magnetic field and the high current passing through the tip molten metal 2. Once the tip molten metal 2 begins to swing even slightly by the above process, it begins to rotate stationarily by the action of Lorentz force (see FIG. 2A).

The rotating phenomenon is prone to occur at an average current density of 300 $A/mm^2$ or more. When pulsed-current welding is adopted to this case, the welding neither presents pulsed spray transfer (see FIG. 2C) as in welding at current densities of less than 300 $A/mm^2$ nor suppresses the rotating phenomenon (see FIG. 2A). The rotating phenomenon may be contrarily accelerated by the high current during the pulse peak time Tp (see FIG. 1) in the pulsed-current welding. For these reasons, the use of the solid wire hardly achieves reduction in spatter generation even when pulsed arc welding is adopted at high current densities.

In contrast, a flux-cored wire includes a cylindrical or tubular steel sheath; and a flux filled in the cylindrical sheath. The flux-cored wire hereby has a nonuniform cross section with the flux occupying the core portion, thereby shows a discontinuous temperature distribution profile in the wire cross section, and reduces the phenomenon in which the extending portion is softened and melts to allow the tip of the wire to elongate, even at high current densities. When pulsed arc welding is adopted to this technique, the arc can have higher arc stiffness by the action of the plasma stream and the magnetic field formed by the arc itself. This inhibits an unstable arc even with high current densities and thereby does not cause the trigger of the rotating phenomenon. This allows pulsed spray transfer even at high current densities, and the resulting molten droplet is smoothly pinched off from the wire tip by the action of high electromagnetic pinch force during the pulse peak time Tp and is absorbed by the molten pool. Furthermore, the use of the pulsed current increases the Joule heating effect in the wire extending portion and thereby increases the deposition rate when welding is performed at the same average current. For these reasons, the flux-cored wire is used in the present invention. As used herein the term "arc stiffness" refers to such a directivity that arc is generated toward the wire feeding direction regardless of the inclination of the welding wire with respect to the base metal (workpiece).

However, such a flux-cored wire has the flux core which does not substantially allow a current to pass therethrough, and therefore a high current passes mainly through the steel sheath. The resulting current passes at very high current densities, and this may cause an unstable phenomenon of local melting of the steel sheath alone, to impair the arc stability and to cause spatter generation. This phenomenon is caused by excessive Joule heating in the steel sheath and occurs particularly when such customary pulse peak current Ip and pulse base current Ib as generally adopted to pulsed arc welding using the solid wire are adopted without optimization, and whereby there is a large difference in current density of 400 A/mm$^2$ or more between the pulse peak time Tp and the pulse base time Tb. Accordingly, the adaptation of customary current waveforms used in common pulsed arc welding as intact fails to reduce spatters although it inhibits the rotating phenomenon.

The present inventors found that gas-shielded arc welding even when performed at high current densities may allow spray transfer by using a flux-cored wire to reduce the frequency of elongation of the tip molten metal and by using a pulsed current to increase the stiffness of arc itself and to suppress the unstable arc, as described above. However, when customary pulsed current waveforms as adopted to the customary solid wires are adopted herein, the unstable phenomenon due to local melting of the steel sheath occurs, and this impedes the reduction of spatter, although the rotating phenomenon is prevented. The present inventors made intensive investigations, focused on the pulse peak current density during the pulse peak time Tp, the pulse base current density during the pulse base time Tb, and the average current density, specified optimal ranges of the respective current densities optimum for the flux-cored wire, and thereby discovered a welding method by which spatters can be reduced even in gas-shielded arc welding at high current densities.

Specifically, optimal ranges are such that the pulse peak current density during the pulse peak time Tp is 400 to 950 A/mm$^2$; the pulse base current density during the pulse base time Tb is 200 A/mm$^2$ or more and differs from the pulse peak current density by 200 to 400 A/mm$^2$; and the average current density is 350 to 750 A/mm$^2$. Pulsed arc welding performed at current densities within the specific ranges extremely less causes spatter generation, because the welding presents stable spray transfer in which the steel sheath melts uniformly and forms a molten droplet together with the molten flux at the tip of the wire, and the molten droplet is smoothly pinched off by the action of the electromagnetic pinch force during the pulse peak time Tp. In addition, the welding gives an effectively increased deposition rate by employing the pulse welding technique. Reasons why the ranges of the current densities are specified will be described below.

Pulse Peak Current Density: 400 to 950 A/mm$^2$

A pulse peak current density, if being less than 400 A/mm$^2$, causes insufficient arc stiffness and fails to give a sufficiently improved deposition rate due to the pulse welding technique. A pulse peak current density, if being more than 950 A/mm$^2$, results in an excessively high current density, thereby causes nonuniform melting of the steel sheath, impairs the arc stability, and increases the spatter generation rate.

Pulse Base Current Density: 200 A/mm$^2$ or more with difference from pulse peak current density of 200 to 400 A/mm$^2$ A pulse base current density, if being less than 200 A/mm$^2$, causes insufficient arc stiffness during the pulse base time Tp, induces unstable arc, and increases the spatter generation rate. If the difference from the corresponding pulse peak current density is less than 200 A/mm$^2$, a desired improved deposition rate due to the pulse welding technique may not be obtained. If the difference from the pulse peak current density is more than 400 A/mm$^2$, the steel sheath may melt nonuniformly to increase the spatter generation rate.

Average Current Density: 350 to 750 A/mm$^2$

Welding, if performed at an average current density of less than 350 A/mm$^2$, results in an insufficient deposition rate. Welding, if performed at an average current density of more than 750 A/mm$^2$, gives an excessively large deposition rate, impedes an effective arc digging effect, causes weld defects such as incomplete penetration and lack of fusion in multilayer welding, and increases the spatter generation rate.

The shielding gas for use in the present invention is not limited typically on its type and chemical composition. In a preferred embodiment, the shielding gas is a gaseous mixture containing $CO_2$ in a content of 5 to 35 percent by volume with the remainder being Ar. The use of the gaseous mixture having such a chemical composition further reduces the spatter generation rate and slag generation rate in the pulsed arc welding.

Shielding Gas: $CO_2$ in a Content of 5 to 35 Percent by Volume with the Remainder being Ar If the shielding gas has a $CO_2$ content of less than 5 percent by volume, the arc may be prone to creep upward the molten droplet, and this may cause the wire tip to melt and be softened to thereby elongate, thus causing rotating transfer even when a flux-cored wire is used. This may often cause the arc to be unstable to cause large amounts of spatters and may cause the arc to meander, resulting in nonuniform shapes of beads. $CO_2$, if contained in a content of more than 35 percent by volume, acts as an oxidizing gas and may cause an endothermic reaction due to its molecular dissociation. The endothermic reaction may cool the arc, thereby often cause the transfer mode of the molten droplet to be globular transfer (see FIG. 2B), and often cause large spatters. In addition, $CO_2$ serving as an oxidizing gas, if contained in a such a high content, may often form oxides and often cause a large amount of slag.

The flux-cored wire for use in the present invention is not limited in its conditions or parameters such as chemical composition, material of the steel sheath, ratio of the cross-sectional area of the steel sheath to the total cross-sectional area of the wire, wire cross-sectional shape, wire diameter, and filling rate of the flux.

In a preferred embodiment, the flux-cored wire has a flux filling rate of 10 to 25 percent by mass based on the total mass of the wire and contains C in a content of 0.08 percent by mass or less, Si in a content of 0.5 to 1.5 percent by mass, Mn in a content of 1.5 to 2.5 percent by mass, and Ti in a content of 0.1 to 0.3 percent by mass. The flux-cored wire in this embodiment contains C, Si, Mn, and Ti as above, with the remainder being iron (Fe) and inevitable impurities. The flux-cored wire, as having the above-specified chemical composition, helps to reduce the spatter generation rate and slag generation rate and to give weld beads with good shape. The above elements, i.e., C, Si, Mn, Ti, and Fe are contained in at least one of the steel sheath and the flux.

Flux Filling Rate: 10 to 25 Percent by Mass

The flux-cored wire, if having a flux filling rate of less than 10 percent by mass, may impair the arc stability to increase the spatter generation rate and may often cause poor appearance of beads. The flux-cored wire, if having a flux filling rate of more than 25 percent by mass, may tend to be broken.

Carbon (C) Content: 0.08 Percent by Mass or Less

Carbon (C) element is contained in or as, for example, steel sheath, ferromanganese, ferrosilicomanganese, and iron powder and is important to ensure the strength of the weld metal. Particularly in the high-current-density gas-shielded arc welding with an Ar—$CO_2$ gaseous mixture, carbon significantly affects the arc stability and is thereby necessary for ensuring arc concentration and arc stability. However, carbon, if present in a content of more than 0.08 percent by mass, may be apt to react with oxygen in the shielding gas to form gaseous carbon monoxide (CO), and the carbon monoxide may often be released from the molten droplet to disturb the droplet transfer, often resulting in an increased spatter generation rate. The carbon content is more preferably 0.02 percent by mass or more for further better arc stability.

Silicon (Si) Content: 0.5 to 1.5 Percent by Mass

Silicon (Si) element is fed typically from or as the steel sheath, metal silicon, ferrosilicon, and ferrosilicomanganese. This element is necessary for ensuring the strength of the weld metal and is also necessary as a deoxidizer. This element also acts for improving the wettability of beads. The flux-cored wire, if having a Si content of less than 0.5 percent by mass, may cause insufficient strength of the weld metal, and, in gas-shielded arc welding at high current densities of 350 A/mm² or more, may cause insufficient deoxidization to thereby invite defects such as blowholes. In addition, this flux-cored wire may cause the molten droplet to be pinched off unsmoothly and to elongate at its tip, thus increasing the spatter generation rate slightly. This flux-cored wire may also cause poor wettability of beads and may often fail to give beads with beautiful shape. In contrast, the flux-cored wire, if having a Si content of more than 1.5 percent by mass, may often increase the slag generation rate.

Manganese (Mn) Content: 1.5 to 2.5 Percent by Mass

Manganese (Mn) element is fed typically from or as the steel sheath, metal manganese, ferromanganese, and ferrosilicomanganese. This element is necessary for ensuring the strength and toughness of the weld metal and is also necessary as a deoxidizer. The flux-cored wire, if having a Mn content of less than 1.5 percent by mass and being used in gas-shielded arc welding at high current densities of 350 A/mm² or more, may cause insufficient deoxidization and may thereby cause defects such as blowholes. In this case, the molten droplet may be pinched off unsmoothly and be apt to elongate at its tip, thus resulting in a slightly increased spatter generation rate. In contrast, the flux-cored wire, if having a Mn content of more than 2.5 percent by mass, may often increase the slag generation rate.

Titanium (Ti) Content: 0.1 to 0.3 Percent by Mass

Titanium (Ti) element is fed typically from or as the steel sheath, metal titanium, ferrotitanium, and $TiO_2$. This element serves as a strong deoxidizer and is necessary for ensuring the strength and toughness of the weld metal. Specifically, the flux-cored wire, if having a Ti content of less than 0.1 percent by mass, may cause the molten droplet to be pinched off unsmoothly and to elongate at its tip, thus resulting in a slightly increased spatter generation rate. In contrast, the flux-cored wire, if having a Ti content of more than 0.3 percent by mass, may increase the slag generation rate and may often impair the slag removability. The Ti content is indicated in terms of the content of metal titanium.

The flux-cored wire may further contain, in addition to the above chemical composition, any of components to be contained in regular flux-cored wires, such as slag-forming materials, deoxidizers, and fluorides. The flux-cored wire preferably has a wire diameter of 1.2 to 1.6 mm, for a high deposition rate at high current densities.

The lengths (durations) of the pulse peak time Tp and pulse base time Tb do not significantly affect the advantageous effects of the present invention and are not critical. However, the pulse peak time Tp is preferably set to be 0.5 to 10 ms, because the long-term application of the pulse peak current Ip may cause the arc length to vibrate. The pulse base time Tb may be set in accordance with the set pulse peak time Tp, so as to give desired average welding current and voltage.

Experimental Example 1

A first experimental example according to the present invention will be described below.

An arc welding was performed under welding conditions below using the shielding gas and pulse parameters (pulse current densities) given in Table 1, and the spatter generation rate and deposition rate were measured and evaluated. The results are shown in Table 1.

The spatter generation rate is determined by performing bead-on-plate welding in a copper box and measuring the weight of spatters collected in the copper box. A sample having a weight of collected spatters of 1 gram per minute or more was evaluated as having a high spatter generation rate (poor suppression in spatter generation: Poor); and one having a weight of collected spatters of less than 1 gram per minute was evaluated as having a low spatter generation rate (good suppression in spatter generation: Good).

The deposition rate was evaluated based on the change in weight of the specimen between before and after welding. A sample having a weight change of less than 150 grams per minute was evaluated as having a low deposition rate (Poor); and one having a weight change of 150 grams per minute or more was evaluated as having a high deposition rate (Good).

As an assessment, a sample evaluated as good both in spatter generation rate and in deposition rate was evaluated as being accepted (Acpt); and one evaluated as poor in at least one of spatter generation rate and deposition rate was evaluated as being rejected (Rej).

Welding Conditions:
Wire (solid): JIS Z3312:1999 YGW11
Wire (FCW): JIS Z3313:1999 YFW-C50DM, having a carbon content of 0.04 percent by mass, a Si content of 1.0 percent by mass, a Mn content of 2.0 percent by mass, and a Ti content of 0.2 percent by mass, and having a flux filling rate of 15 percent by mass
Specimen (base metal; workpiece): SS400 25-mm thick
Tip-Workpiece Distance: 25 mm
Angle of Advance of Torch: 20 degrees
Welding Speed: 60 cm/min.

rates due to nonuniform melting of the steel sheath, and were rejected. Comparative Example of Sample No. 10 was prepared at an average current density of less than the lower limit, thereby showed a low deposition rate, and was rejected. Comparative Example of Sample No. 11 was prepared at a pulse peak current density, a pulse base current density, and an average current density of respectively less than the lower limits, showed a low deposition rate, had a high spatter generation rate, and was rejected. Comparative Example of Sample No. 12 was prepared at a pulse base current density of less than the lower limit, thereby had a high spatter generation rate, and was rejected. Comparative Example of Sample No. 13 was prepared at a pulse peak

TABLE 1

| | Sample No. | Wire | Wire diameter (mm) | Shielding gas | Pulse peak current density (A/mm$^2$) | Pulse base current density (A/mm$^2$) | Difference between pulse peak current density and pulse base current density (A/mm$^2$) | Average current density (A/mm$^2$) | Spatter generation rate (g/min) | Deposition rate (g/min) | Assessment |
|---|---|---|---|---|---|---|---|---|---|---|---|
| Comparative Example | 1 | Solid | 1.2 | Ar— 20% $CO_2$ | 442 | 71 | 371 | 347 | Poor 2.51 | Good 182 | Rej |
| | 2 | Solid | 1.4 | Ar— 20% $CO_2$ | 390 | 65 | 325 | 312 | Poor 1.93 | Good 204 | Rej |
| | 3 | Solid | 1.2 | Ar— 20% $CO_2$ | 460 | 239 | 221 | 372 | Poor 2.22 | Good 192 | Rej |
| | 4 | Solid | 1.2 | 100% $CO_2$ | — | — | — | 354 | Poor 3.45 | Good 178 | Rej |
| | 5 | FCW | 1.2 | 100% $CO_2$ | — | — | — | 502 | Poor 2.16 | Good 232 | Rej |
| | 6 | FCW | 1.2 | Ar— 20% $CO_2$ | — | — | — | 520 | Poor 1.43 | Good 241 | Rej |
| | 7 | FCW | 1.4 | Ar— 20% $CO_2$ | — | — | — | 436 | Poor 1.32 | Good 272 | Rej |
| | 8 | FCW | 1.2 | Ar— 20% $CO_2$ | 553 | 88 | 465 | 389 | Poor 1.83 | Good 168 | Rej |
| | 9 | FCW | 1.4 | Ar— 20% $CO_2$ | 487 | 81 | 406 | 366 | Poor 1.44 | Good 208 | Rej |
| | 10 | FCW | 1.2 | Ar— 25% $CO_2$ | 594 | 253 | 341 | 316 | Good 0.77 | Poor 116 | Rej |
| | 11 | FCW | 1.4 | Ar— 20% $CO_2$ | 390 | 111 | 279 | 297 | Poor 1.22 | Poor 139 | Rej |
| | 12 | FCW | 1.4 | Ar— 10% $CO_2$ | 463 | 139 | 324 | 371 | Poor 1.14 | Good 202 | Rej |
| | 13 | FCW | 1.4 | Ar— 15% $CO_2$ | 390 | 213 | 177 | 284 | Good 0.98 | Poor 126 | Rej |
| | 14 | FCW | 1.2 | Ar— 25% $CO_2$ | 973 | 316 | 657 | 594 | Poor 1.24 | Good 279 | Rej |
| | 15 | FCW | 1.6 | Ar— 20% $CO_2$ | 391 | 170 | 221 | 242 | Poor 1.15 | Poor 124 | Rej |
| | 16 | FCW | 1.2 | Ar— 15% $CO_2$ | 940 | 553 | 387 | 774 | Poor 1.32 | Good 355 | Rej |
| Example | 17 | FCW | 1.2 | Ar— 15% $CO_2$ | 695 | 300 | 395 | 549 | Good 0.73 | Good 252 | Acpt |
| | 18 | FCW | 1.2 | Ar— 30% $CO_2$ | 922 | 550 | 372 | 708 | Good 0.88 | Good 327 | Acpt |
| | 19 | FCW | 1.4 | Ar— 25% $CO_2$ | 584 | 278 | 306 | 487 | Good 0.79 | Good 316 | Acpt |
| | 20 | FCW | 1.4 | Ar— 10% $CO_2$ | 788 | 391 | 397 | 575 | Good 0.81 | Good 373 | Acpt |
| | 21 | FCW | 1.4 | Ar— 20% $CO_2$ | 511 | 284 | 227 | 455 | Good 0.63 | Good 274 | Acpt |
| | 22 | FCW | 1.6 | Ar— 20% $CO_2$ | 419 | 210 | 209 | 355 | Good 0.65 | Good 228 | Acpt |
| | 23 | FCW | 1.6 | Ar— 35% $CO_2$ | 498 | 284 | 214 | 405 | Good 0.72 | Good 258 | Acpt |

"Solid" represents the solid wire; and "FCW" represents the flux-cored wire.

As is demonstrated from Table 1, Examples of Sample Nos. 17 to 23 were prepared under conditions satisfying the requirements in the present invention, thereby had low spatter generation rates and high deposition rates, and were accepted.

In contrast, Comparative Examples of Sample Nos. 1 to 16 prepared under conditions not satisfying the requirements in the present invention were rejected as mentioned below. Specifically, Comparative Examples of Sample Nos. 1 to 3 were prepared through welding with an Ar—$CO_2$ gas mixture as a shielding gas and with a solid wire, whereby showed high spatter generation rates due to rotating transfer, and were rejected. Comparative Examples of Sample Nos. 4 and 5 were prepared while using 100 percent by volume $CO_2$ as a shielding gas, thereby showed high spatter generation rates due to globular transfer, and were rejected. Comparative Examples of Sample Nos. 6 and 7 were prepared without using a pulsed current as the welding current, thereby showed high spatter generation rates, and were rejected.

Comparative Examples of Sample Nos. 8 and 9 were prepared at a pulse base current density of less than the lower limit and with a difference between the pulse peak current density and the pulse base current density of more than the upper limit, thereby showed high spatter generation rates due to nonuniform melting of the steel sheath, and were current density, a difference between the pulse peak current density and the pulse base current density, and an average current density of respectively less than the lower limits, thereby showed a low deposition rate, and was rejected. Comparative Example of Sample No. 14 was prepared at a pulse peak current density and a difference between the pulse peak current density and the pulse base current density of respectively less than the upper limits, thereby showed a high spatter generation rate, and was rejected. Comparative Example of Sample No. 15 was prepared at a pulse peak current density, a pulse base current density, and an average current density of respectively less than the lower limits, thereby showed a high spatter generation rate and a low deposition rate, and was rejected. Comparative Example of Sample No. 16 was prepared at an average current density of more than the upper limit, thereby had a high spatter generation rate, and was rejected.

Experimental Example 2

A second experimental example according to the present invention will be described below.

An arc welding was performed under welding conditions below using the flux-cored wires given in Table 2, and the spatter generation rate and slag generation rate were measured and evaluated by the procedure of Experimental Example 1. The results are shown in Table 2.

The spatter generation rate was measured and determined by the procedure of Experimental Example 1. A sample having a spatter generation rate of 0.6 gram per minute or more and less than 1 gram per minute was evaluated as having a low spatter generation rate (good suppression in spatter generation; Good); and one having a spatter generation rate of less than 0.6 gram per minute was evaluated as having a further low spatter generation rate (excellent suppression in spatter generation; Excellent).

The slag generation rate was determined by performing two-layer two-pass welding (welding length of 30 cm) in a single-bevel groove with a groove angle of 35 degrees, collecting the whole quantity of generated slag, and measuring the weight of the collected slag. A sample having a slag weight of 7 grams or less was evaluated as having a low slag generation rate (excellent in suppression of slag generation; Excellent); and one having a slag weight of more than 7 grams was evaluated as having a somewhat high slag generation rate (good in suppression of slag generation; Good).

As the assessment, a sample evaluated as excellent both in spatter generation rate and slag generation rate was evaluated as being excellent (Excellent); and one evaluated as good in at least one of spatter generation rate and slag generation rate was evaluated as being good (Good).

Welding Conditions
Wire Diameter: 1.4 mm
Shielding Gas: Ar-20 percent by volume $CO_2$
Specimen (base metal; workpiece): SS400 25-mm thick
Tip-Workpiece Distance: 25 mm
Welding Speed: 60 cm/min.
Pulse Peak Current Density: 520 A/mm$^2$
Pulse Base Current Density: 280 A/mm$^2$
Average Current Density: 460 A/mm$^2$

TABLE 2

| Sample No. | | Chemical composition (percent by mass) | | | | Flux filling rate (percent by mass) | Spatter generation rate (g/min) | Slag generation rate (g) | Assessment |
|---|---|---|---|---|---|---|---|---|---|
| | | C | Si | Mn | Ti | | | | |
| Example | 24 | 0.10 | 1.1 | 1.9 | 0.12 | 10 | Good 0.72 | Excellent 6.3 | Good |
| | 25 | 0.03 | 0.3 | 1.5 | 0.11 | 15 | Good 0.68 | Excellent 5.1 | Good |
| | 26 | 0.06 | 1.6 | 2.2 | 0.16 | 13 | Excellent 0.52 | Good 7.3 | Good |
| | 27 | 0.04 | 0.8 | 1.3 | 0.21 | 16 | Good 0.65 | Excellent 6.2 | Good |
| | 28 | 0.05 | 1.2 | 2.7 | 0.25 | 18 | Good 0.61 | Good 9.5 | Good |
| | 29 | 0.07 | 0.5 | 1.7 | 0.05 | 16 | Good 0.82 | Excellent 4.5 | Good |
| | 30 | 0.04 | 1.3 | 2.1 | 0.33 | 15 | Excellent 0.51 | Good 9.2 | Good |
| | 31 | 0.03 | 0.7 | 2.2 | 0.15 | 14 | Excellent 0.32 | Excellent 6.1 | Excellent |
| | 32 | 0.08 | 0.9 | 1.9 | 0.18 | 12 | Excellent 0.49 | Excellent 6.6 | Excellent |
| | 33 | 0.03 | 0.5 | 2.0 | 0.19 | 18 | Excellent 0.33 | Excellent 6.2 | Excellent |
| | 34 | 0.03 | 1.5 | 1.7 | 0.19 | 16 | Excellent 0.35 | Excellent 6.8 | Excellent |
| | 35 | 0.04 | 1.1 | 1.5 | 0.21 | 13 | Excellent 0.51 | Excellent 6.2 | Excellent |
| | 36 | 0.06 | 0.8 | 2.4 | 0.14 | 19 | Excellent 0.45 | Excellent 6.1 | Excellent |
| | 37 | 0.03 | 0.8 | 2.0 | 0.12 | 18 | Excellent 0.45 | Excellent 4.9 | Excellent |
| | 38 | 0.07 | 1.0 | 2.2 | 0.26 | 14 | Excellent 0.56 | Excellent 6.9 | Excellent |

As is demonstrated from Table 2, of Examples of Sample Nos. 24 to 38 prepared under conditions satisfying the requirements in the present invention, Examples of Sample Nos. 31 to 38 employed the flux-cored wires having chemical compositions within the preferred range in the present invention had lower spatter generation rates and lower slag generation rates and were assessed as excellent, as compared to Examples of Sample Nos. 24 to 30 employing the flux-cored wires having chemical compositions out of the preferred range. As measured by the procedure of Experimental Example 1, Examples of Sample Nos. 24 to 38 all had high deposition rates of 150 gram per minute or more.

What is claimed is:

1. A method for high-current-density gas-shielded arc welding, the method comprising:
performing pulsed arc welding with a flux-cored wire as an electrode wire, and the flux-cored wire comprises
a steel sheath; and
a flux filled in the sheath, and
the flux-cored wire has a flux filling rate of 10 to 25 percent by mass based on the total mass of the wire and contains carbon (C) in a content of 0.08 percent by mass or less, silicon (Si) in a content of 0.5 to 1.5 percent by mass, manganese (Mn) in a content of 1.5 to 2.5 percent by mass, and titanium (Ti) in a content of 0.1 to 0.3 percent by mass,
wherein the pulsed arc welding is carried out by passing a pulsed current so that a pulse peak current density during a pulse peak time Tp is 400 to 950 A/mm$^2$, a pulse base current density during a pulse base time Tb is 200 A/mm$^2$ or more and differs from the pulse peak current density by 200 to 400 A/mm$^2$, and an average current density is 350 to 750 A/mm$^2$, and
wherein the average current density is calculated by dividing an average of the pulsed current during the pulsed arc welding by a sectional area of a current path in the flux-cored wire and calculating the average of the pulsed current during the pulsed arc welding using the formula Ia=(Ip Tp+Ib Tb)/(Tp+Tb), where Ia is the average of the pulsed current, Ip is a pulse peak current, Ib is a pulse base current, Tp is a duration of the pulse peak current, and Tb is a duration of the pulse base current.

2. The method according to claim 1,
wherein the shielding gas is a gaseous mixture containing carbon dioxide ($CO_2$) in a content of 5 to 35 percent by volume with the remainder being argon (Ar).

3. The method according to claim 1, wherein the pulsed current includes a current waveform with repeating pulse forms that are all identical.

4. The method according to claim 1, wherein a duration of the pulse peak time Tp is 0.5 to 10 ms.

5. The method according to claim 1, wherein the pulse base current density during the pulse base time Tb is more than 200 A/mm².

6. The method according to claim 1, wherein the performing pulsed arc welding includes welding at a deposition rate of 150 grams per minute or more.

7. The method according to claim 1, wherein the flux-cored wire includes a diameter of 1.2 to 1.6 mm.

8. The method according to claim 1, wherein the performing pulsed arc welding includes welding by spray transfer.

* * * * *